US012794401B2

(12) United States Patent
Sable et al.

(10) Patent No.: US 12,794,401 B2
(45) Date of Patent: Nov. 10, 2026

(54) SOLAR MODULE RAIL COUPLINGS FOR SOLAR TRACKER

(71) Applicant: Nextpower LLC, Fremont, CA (US)

(72) Inventors: Abhimanyu Sable, Hyderabad (IN); Phani Kumar, Hyderabad (IN); Michael Starr, San Francisco, CA (US)

(73) Assignee: Nextpower LLC, Fremont, CA (US)

(*) Notice: Subject to any disclaimer, the term of this patent is extended or adjusted under 35 U.S.C. 154(b) by 237 days.

(21) Appl. No.: 18/454,601

(22) Filed: Aug. 23, 2023

(65) Prior Publication Data

US 2024/0072721 A1 Feb. 29, 2024

Related U.S. Application Data

(60) Provisional application No. 63/400,608, filed on Aug. 24, 2022.

(51) Int. Cl.
*H02S 20/32* (2014.01)
*F16B 5/06* (2006.01)
(Continued)

(52) U.S. Cl.
CPC .............. *H02S 20/32* (2014.12); *H02S 30/00* (2013.01); *F16B 5/0685* (2013.01); (Continued)

(58) Field of Classification Search
CPC .......... H02S 20/32; H02S 30/00; H02S 20/20; H02S 30/10; Y02E 10/47; F16B 5/0685; F16B 13/0816
See application file for complete search history.

(56) References Cited

U.S. PATENT DOCUMENTS

| | | | | |
|---|---|---|---|---|
| 4,037,513 A * | 7/1977 | Hobson | .................. | F16B 21/12 411/513 |
| 5,253,965 A * | 10/1993 | Angel | ..................... | F16B 15/06 411/930 |

(Continued)

FOREIGN PATENT DOCUMENTS

| | | |
|---|---|---|
| AU | 2020373193 A1 | 4/2022 |
| CN | 113841332 A | 12/2021 |
| WO | 2022056487 A1 | 3/2022 |

OTHER PUBLICATIONS

International Patent Application No. PCT/US2023/072752, International Search Report and Written Opinion, mailed Jan. 15, 2024, 15 pages.

*Primary Examiner* — Omar F Hijaz
(74) *Attorney, Agent, or Firm* — Fredrikson & Byron, P.A.

(57) ABSTRACT

A coupling system for use with a solar tracker includes a support rail including a pair of opposed flanges disposed in spaced relation to one another and defining a channel therebetween, each of the pair of opposed flanges including a respective slot defined therethrough, and a coupling clip configured to be received within each of the slots and a portion of a module rail received within the channel of the support rail, wherein the coupling clip includes a resilient finger disposed on a distal end portion configured to engage a portion of the pair of opposed flanges to inhibit proximal movement of the coupling clip and a one protrusion disposed on a proximal portion thereof configured to engage a portion of an opposite flange of the pair of opposed flanges to inhibit distal movement of the coupling clip to couple the module rail to the support rail.

20 Claims, 14 Drawing Sheets

(51) Int. Cl.
*F16B 13/08* (2006.01)
*H02S 20/20* (2014.01)
*H02S 30/00* (2014.01)
*H02S 30/10* (2014.01)

(52) U.S. Cl.
CPC ........... *F16B 13/0816* (2013.01); *H02S 20/20* (2014.12); *H02S 30/10* (2014.12); *Y02E 10/47* (2013.01)

(56) References Cited

U.S. PATENT DOCUMENTS

| | | | | | |
|---|---|---|---|---|---|
| 6,135,692 | A * | 10/2000 | Lary | F16B 21/125 | 411/530 |
| 6,905,299 | B2 * | 6/2005 | Moores, Jr. | F16B 15/04 | 411/451.3 |
| 7,763,835 | B2 * | 7/2010 | Romeo | F24S 30/452 | 250/239 |
| 9,276,521 | B2 * | 3/2016 | Reed | F24S 25/65 | |
| 10,917,039 | B2 * | 2/2021 | Corio | F16M 11/18 | |
| 12,009,777 | B2 * | 6/2024 | Jacobs | H02S 20/32 | |
| 2013/0192157 | A1 * | 8/2013 | Coyle | B32B 21/047 | 52/586.1 |
| 2014/0246549 | A1 * | 9/2014 | West | H02S 20/23 | 248/220.22 |
| 2015/0090316 | A1 * | 4/2015 | Song | H02S 20/32 | 136/246 |
| 2017/0319319 | A1 * | 11/2017 | Fischer | A61B 17/068 | |
| 2017/0359017 | A1 | 12/2017 | Corio | | |
| 2021/0351738 | A1 * | 11/2021 | Schuknecht | F16B 2/185 | |
| 2022/0294386 | A1 * | 9/2022 | Creasy | B21D 28/02 | |
| 2024/0372506 | A1 * | 11/2024 | Delgado-Nanez | F24S 25/65 | |

* cited by examiner

S7 Tracker rail design concept

S7 Tracker rail - Front View

S7 Tracker rail - Top View

S7 Tracker rail-ISO View

S7 Tracker rail-Front View

S7 Tracker rail-Side View

S7 Tracker rail-Top View

Connection clip design concept-
ISO View

Connection clip design concept-
Top View

Connection clip design concept-
Side View

Connection clip design concept-
Front View

Connection clip design concept-
ISO View

Connection clip design concept-
Top View

Connection clip design concept-
Side View

Connection clip design concept-
Front View

Connection clip design concept-
ISO View

Connection clip design concept-
Top View

Connection clip design concept-
Side View

Connection clip design concept-
Front View

Connection clip design concept
Side View

Connection clip design concept-
Front View

Connection clip design concept-
Top View

Connection clip design concept-
ISO View

S7 Tracker rail design concept

S7 Tracker rail - Front View

S7 Tracker rail - Top View

S7 Tracker rail - Side View

S7 Tracker rail - Top View

S7 Tracker rail - Front View

S7 Tracker rail - ISO View

Section view of Integrated wedge rail assembly at the slot position

Integrated wedge rail assembly - Side view

S7 Assembly - ISO View

S7 Assembly - Front View

S7 Assembly - Side View

S7 Assembly - Bottom View

Clip hooks into side either side of slots on hat channel/box channel (rail)

Rotating the clip forces the hook through the slot in the rail, securing the part Clip pairs are secured to the tube using our existing strap methods. (rail not pictured)

SOLAR MODULE RAIL COUPLINGS FOR SOLAR TRACKER

RELATED MATTERS

This application claims the benefit of U.S. Provisional Patent Application No. 63/400,608, filed Aug. 24, 2022, the entire contents of which are incorporated herein by reference.

BACKGROUND

Technical Field

The present disclosure relates to solar power generation systems, and more particularly, to clamps and clamping systems for securing solar modules to a support structure.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

BRIEF DESCRIPTION OF THE DRAWINGS

Various aspects and features of the present disclosure are described hereinbelow with reference to the drawings, wherein.

DETAILED DESCRIPTION

Figure 2A:
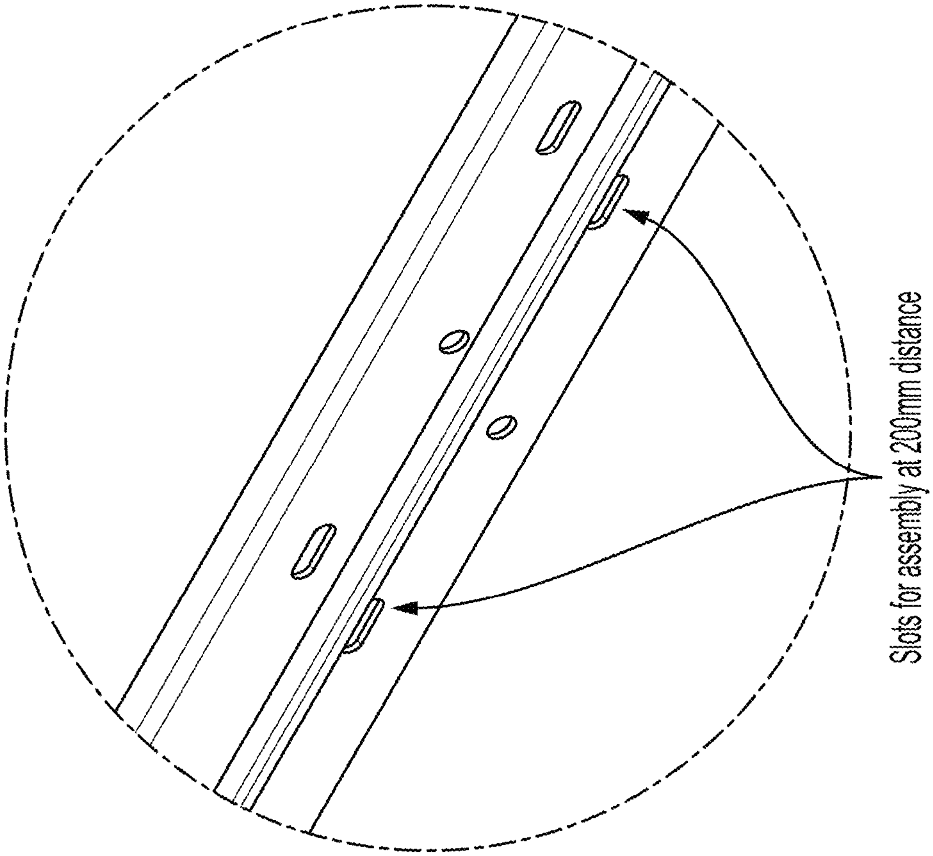
FIG. 2A is an enlarged view of the area of detail indicated in FIG. 2.
Figure 1:
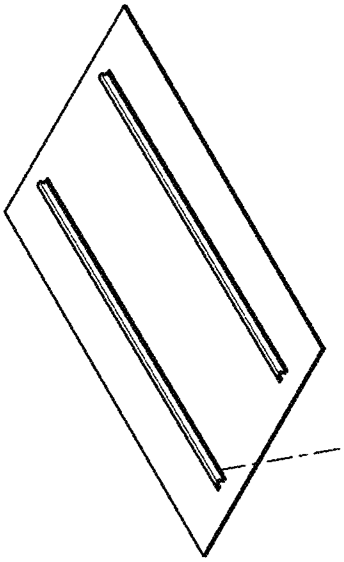
FIG. 1 is a perspective view of a solar module assembly provided in accordance with the present disclosure.
Figure 2:
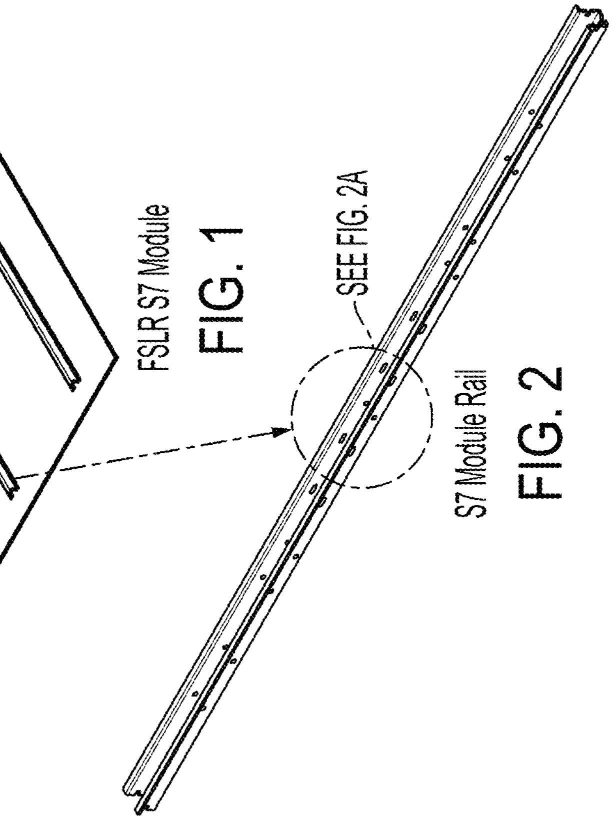
FIG. 2 is a perspective view of a solar module rail of the solar module assembly of FIG. 1.
Figure 3:
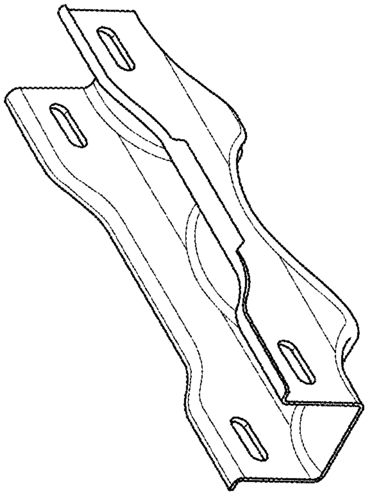
FIG. 3 is a perspective view of a solar tracker rail provided in accordance with the present disclosure.
Figure 4:
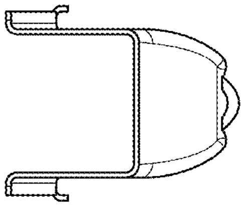
FIG. 4 is a side, elevation view of the solar tracker rail of FIG. 3.
Figure 5:
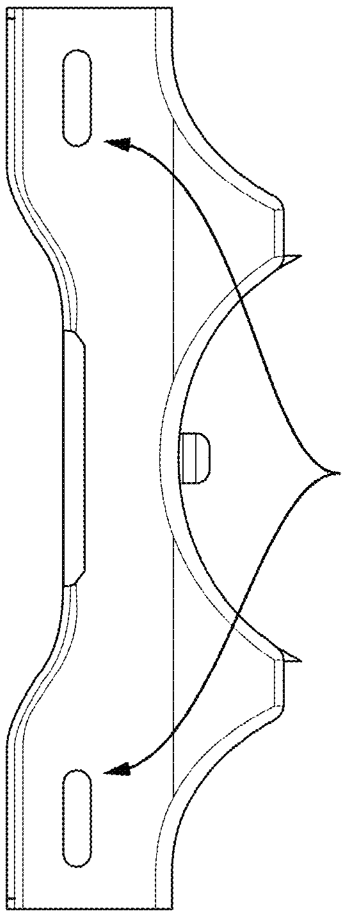
FIG. 5 is a front, elevation view of the solar tracker rail of FIG. 3.
Figure 6:
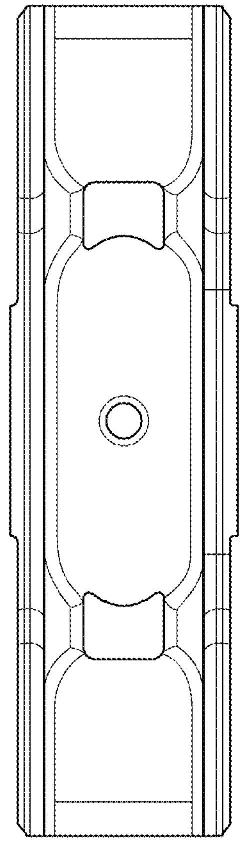
FIG. 6 is a plan view of the solar tracker rail of FIG. 3.
Figure 7:
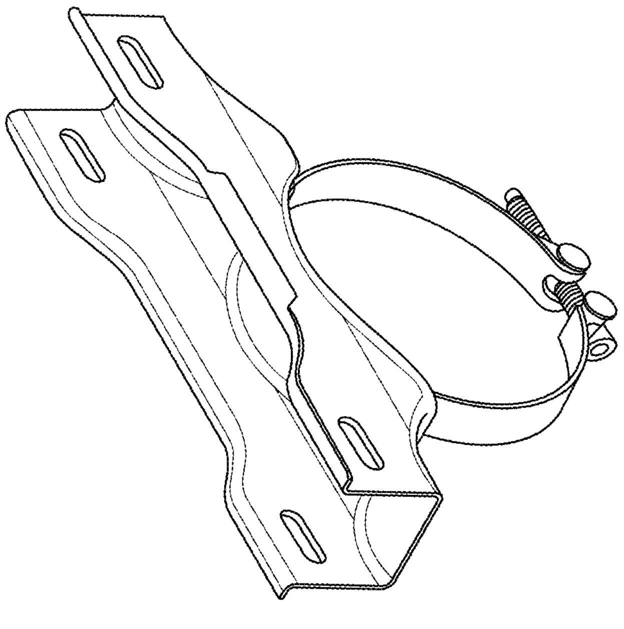
FIG. 7 is a perspective view of a solar tracker rail assembly provided in accordance with the present disclosure, shown coupled the solar tracker rail of FIG. 3.
Figure 8:
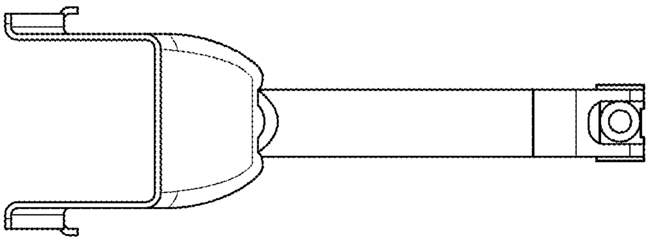
FIG. 8 is a side, elevation view of the solar tracker rail assembly of FIG. 7.
Figure 9:
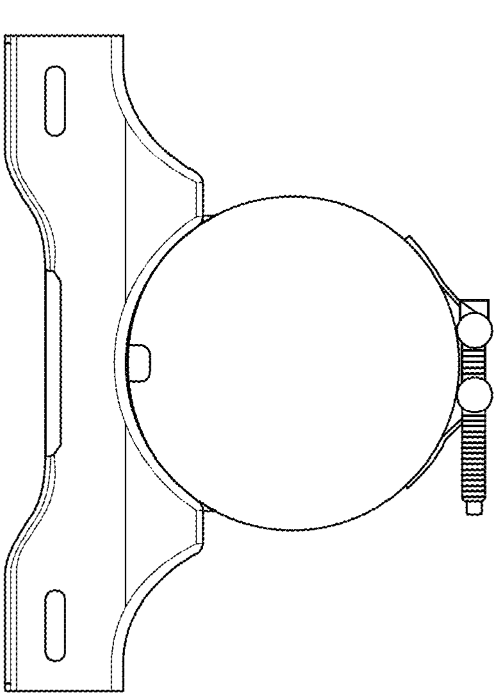
FIG. 9 is a front, elevation view of the solar tracker rail assembly of FIG. 7.
Figure 10:
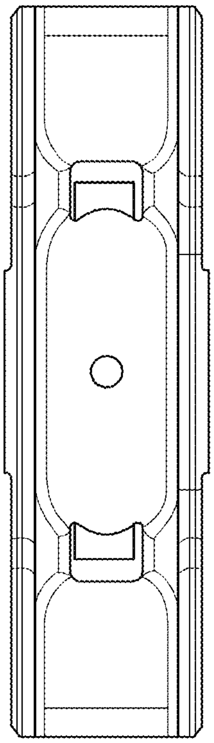
FIG. 10 is a plan view of the solar tracker rail assembly of FIG. 7.

The present disclosure is directed to a coupling system for use with a solar tracker. Referring now to the drawings, FIGS. 1-2A illustrate an FSLR series-7 (S7) photovoltaic (PV) module consisting of a sheet metal frame with multiple holes and slots. These slots are used to assembly with a solar tracker mounting rail (module mounting rail) arrangement. The S7 module mounting key feature is to have a snap-fil or quick fitting between the module rail and the tracker rail without using any conventional or permanent fastening methods. Through slots are provided at 200 mm distance and 500 mm distance from the center. 2 slots or all 4 slots can be used for mounting purposes per rail.

FIGS. 3-10 illustrate a tracker rail having through slots that are similar to the module hat channel. Here, a dimple with a semi-circular profile is shown for positive engagement of a torque tube and a tracker rail but a positive engagement mechanism is applicable to other profiles of the tube such as square, D-tube, Hexagon, Oval, Rectangular Hollow section (RHS), etc. Two slots that are 200 mm apart are shown for mounting but based on mounting requirements the number of slots can be expanded to 4 slots.

Figure 12:
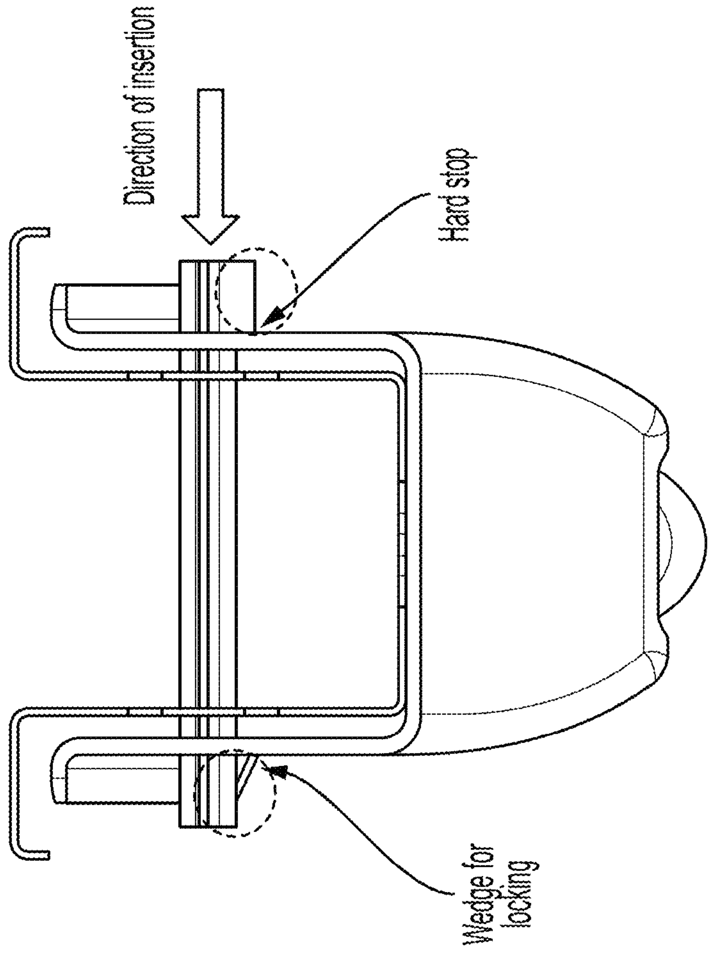
FIG. 12 is a side, elevation view of the solar tracker rail of FIG. 3 shown coupled to the solar module rail of FIG. 1 using the solar tracker rail clip of FIG. 11.
Figure 11:
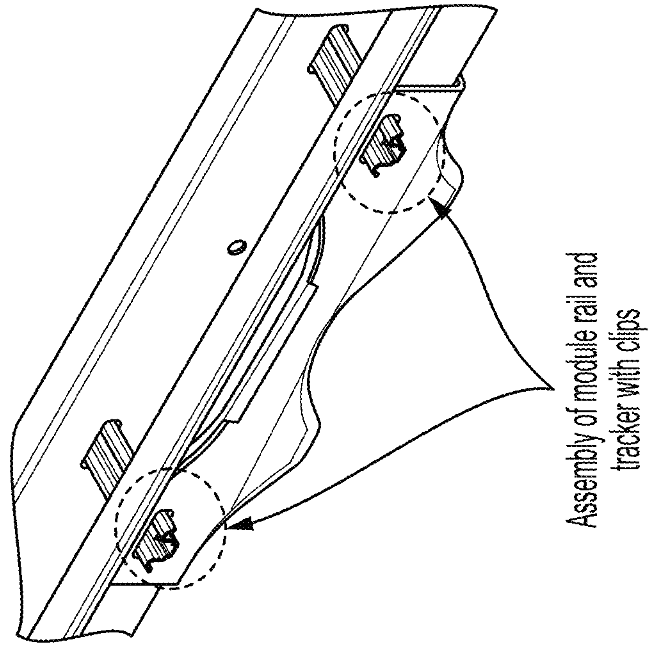
FIG. 11 is a perspective view of the solar tracker rail of FIG. 3 shown coupled to the solar module rail of FIG. 1 using a solar tracker rail clip provided in accordance with the present disclosure.
Figure 13:
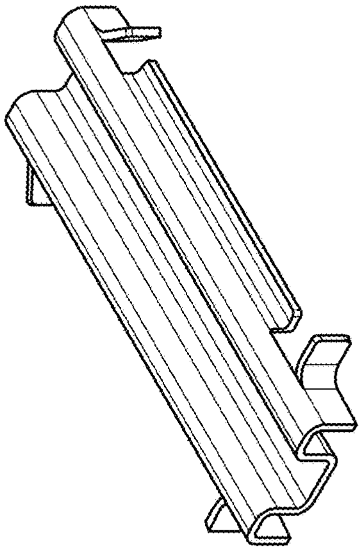
FIG. 13 is a perspective view of a solar tracker rail clip provided in accordance with the present disclosure.
Figure 14:
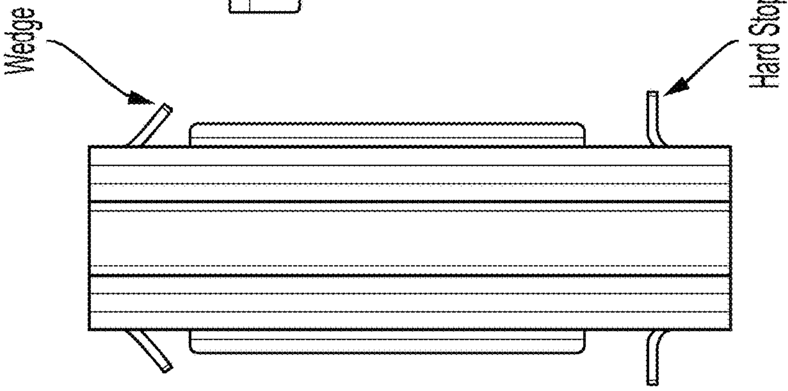
FIG. 14 is a plan view of the solar tracker rail clip of FIG. 13.
Figure 15:
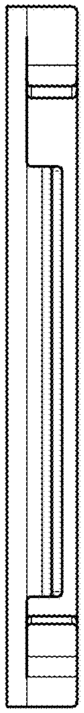
FIG. 15 is a front, elevation view of the solar tracker rail clip of FIG. 13.
Figure 16:
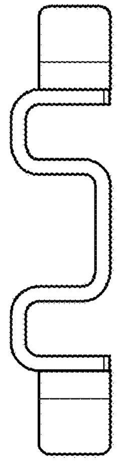
FIG. 16 is a side, elevation view of the solar tracker rail clip of FIG. 13.
Figure 17:
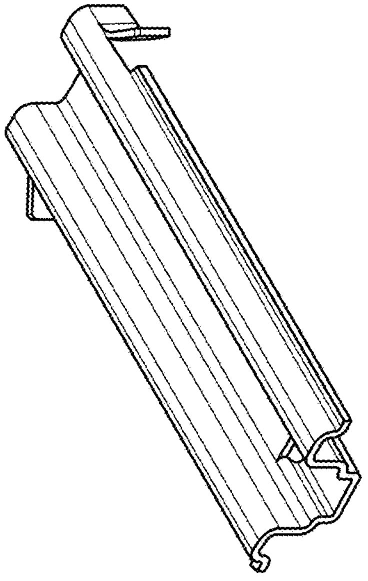
FIG. 17 is a perspective view of another embodiment of a solar tracker rail clip provided in accordance with the present disclosure.
Figure 18:
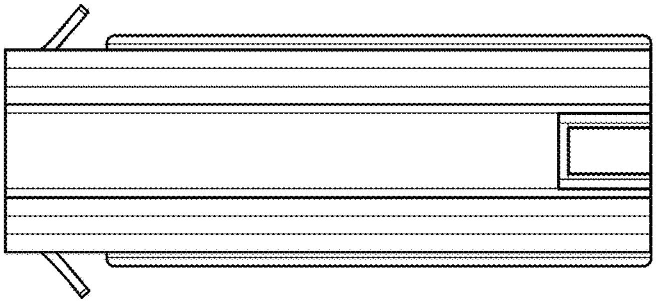
FIG. 18 is a plan view of the solar tracker rail clip of FIG. 17.
Figure 19:
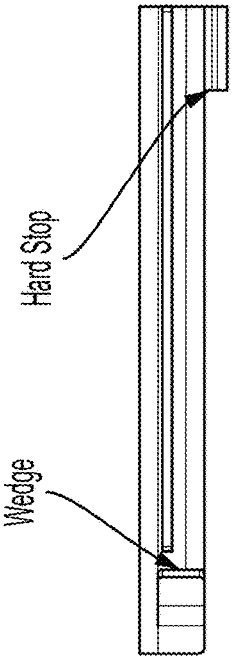
FIG. 19 is a front, elevation view of the solar tracker rail clip of FIG. 17.
Figure 20:
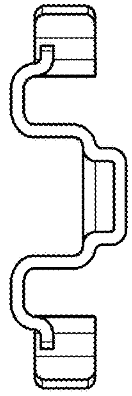
FIG. 20 is a side, elevation view of the solar tracker clip of FIG. 17.
Figure 21:
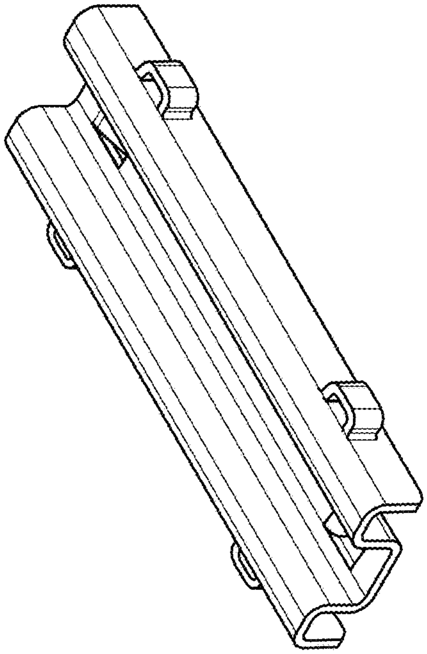
FIG. 21 is a perspective view of yet another embodiment of a solar tracker rail clip provided in accordance with the present disclosure.
Figure 22:
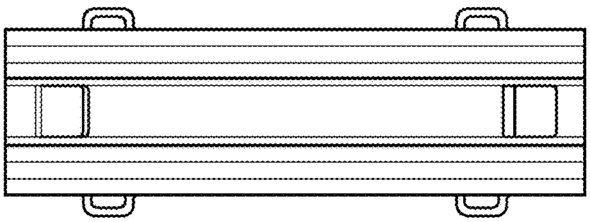
FIG. 22 is a plan view of the solar tracker rail clip of FIG. 21.
Figure 23:
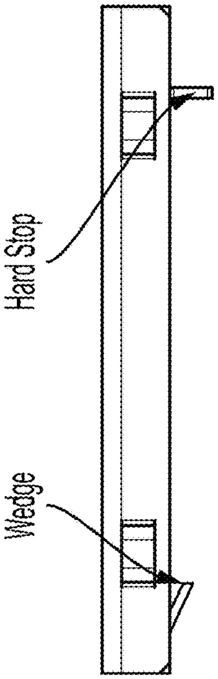
FIG. 23 is a front, elevation view of the solar tracker rail clip of FIG. 21.
Figure 24:
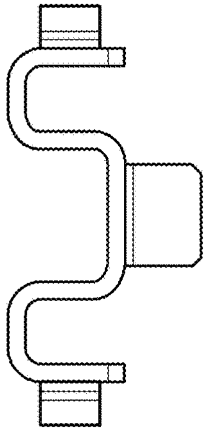
FIG. 24 is a side, elevation view of the solar tracker rail clip of FIG. 21.
Figure 27:
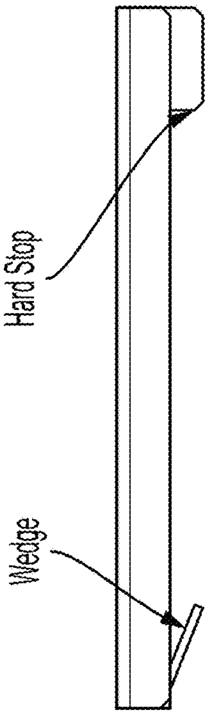
FIG. 27 is a front, elevation view of the solar tracker rail clip of FIG. 25.
Figure 28:
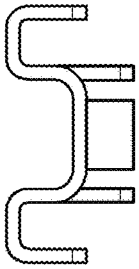
FIG. 28 is a side, elevation view of the solar tracker rail clip of FIG. 25.
Figure 26:
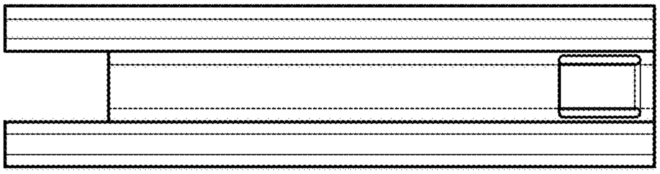
FIG. 26 is a plan view of the solar tracker rail clip of FIG. 25.
Figure 25:
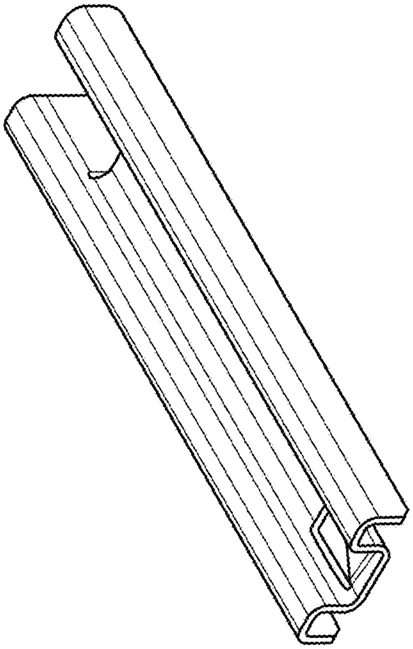
FIG. 25 is still another embodiment of a solar tracker rail clip provided in accordance with the present disclosure.
Figure 29:
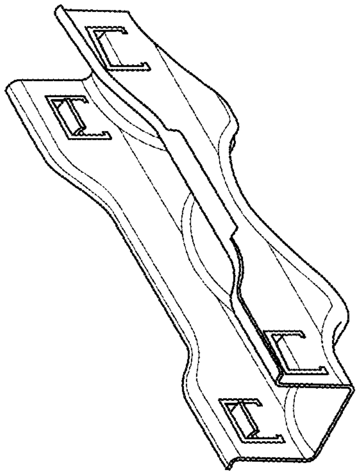
FIG. 29 is a perspective view of another embodiment of a solar tracker rail provided in accordance with the present disclosure.
Figure 30:
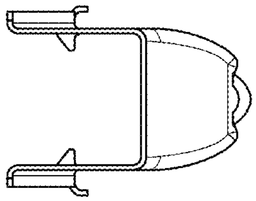
FIG. 30 is a side, elevation view of the solar tracker rail of FIG. 29.
Figure 31:
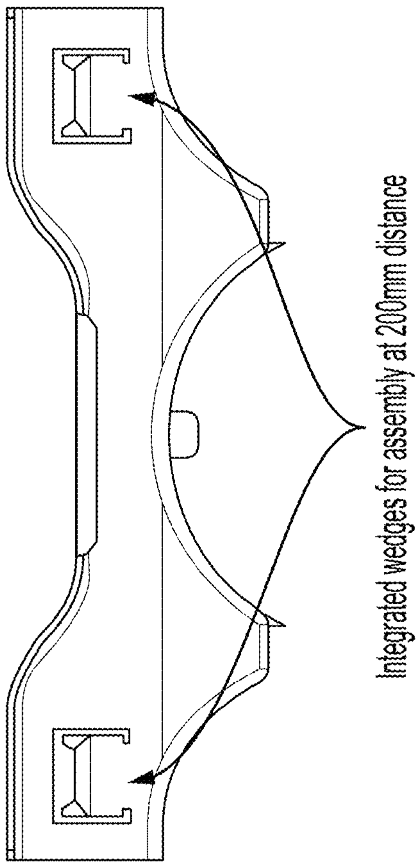
FIG. 31 is a front, elevation view of the solar tracker rail of FIG. 29.
Figure 32:
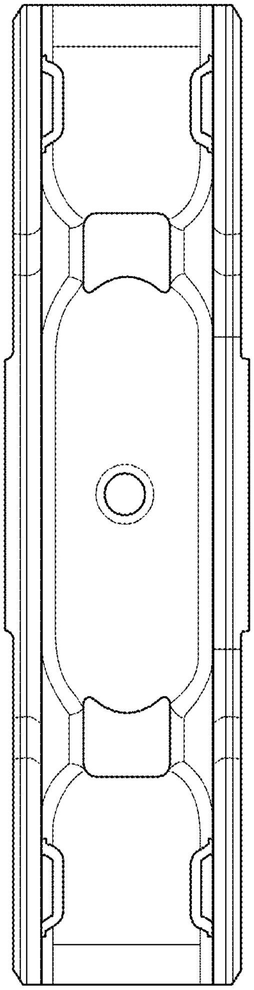
FIG. 32 is a plan view of the solar tracker rail of FIG. 29.
Figure 35:
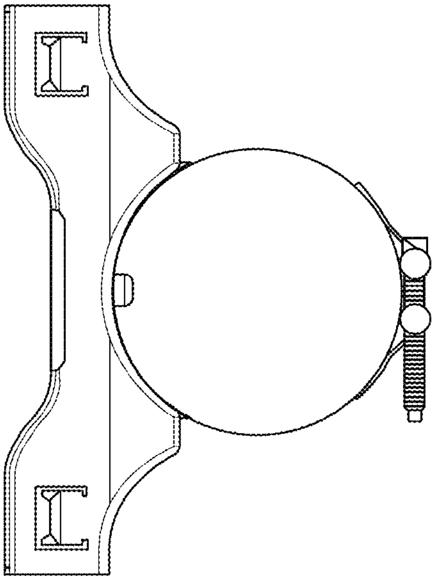
FIG. 35 is a front, elevation view of the solar tracker rail assembly of FIG. 33.
Figure 36:
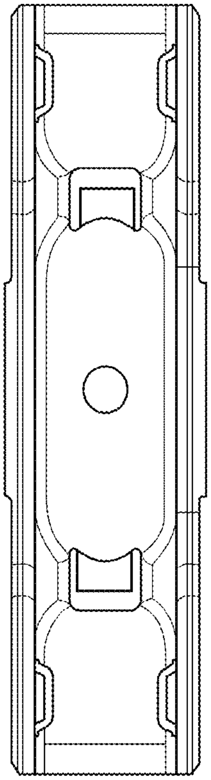
FIG. 36 is a plan view of the solar tracker rail assembly of FIG. 33.
Figure 34:
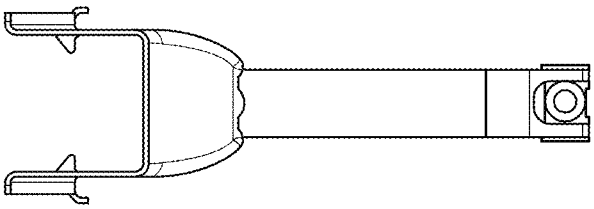
FIG. 34 is a side, elevation view of the solar tracker rail assembly of FIG. 33.
Figure 33:
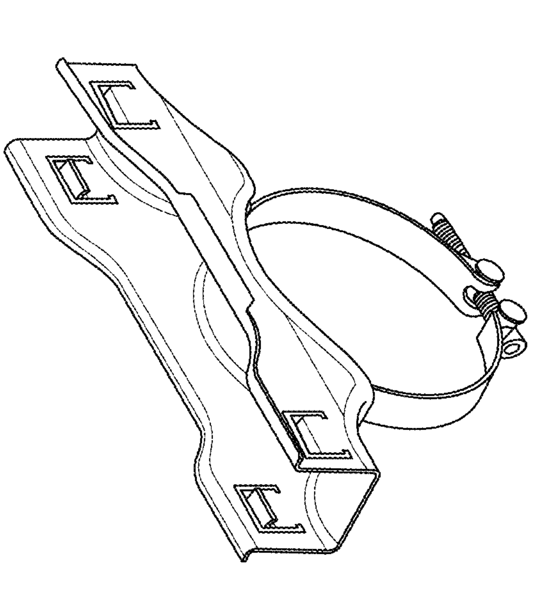
FIG. 33 is a perspective view of another embodiment of a solar tracker rail assembly provided in accordance with the present disclosure, shown coupled the solar tracker rail of FIG. 29.

FIGS. 11 and 12 illustrate sheet metal clips for achieving a snap-fit/quick fit between the module rail and the tracker rail. The clips consist of a wedge and a hard stop. The wedge enables the passage of the clip through slots and engages in position once it is expanded due to elongation of the material. The expansion also prevents the clip from traveling in the return direction of insertion. The hard stop limits the travel of the clip to the required distance such that once it reaches the maximum distance the clip cannot travel further, and the clip is held in the required position. The wedges and hard stops on the clip can be different profiles and configurations, as will be described in further detail hereinbelow.

FIGS. 13-16 illustrate clips having wedges on side walls that will compress and expand. The wedges are at a 35-degree angle from the center axis. The angle may vary based on load requirements and the slot size provided on the module rail to achieve the holding capacity. The hard stop is provided on the side wall which is perpendicular to the clip's travel direction. This perpendicular hard stop prevents travel of the clip after reaching its maximum distance by interfering with the tracker rail.

FIGS. 17-20 illustrate clips substantially similar to the clips described hereinabove with respect to FIGS. 13-16 except that the clips illustrated in FIGS. 17-20 include a hard stop formed on a lower surface and forms a vertical wall that is perpendicular to the clip's travel direction. As can be appreciated, this perpendicular hard stop prevents the travel of the clip after reaching maximum distance by interfering with the tracker rail.

FIGS. 21-24 illustrate clips having a wedge on the bottom wall that will compress and expand. The wedge is formed at a 15-degree angle relative to the center axis and the angle may vary based on load requirements and slot sizes provided on the module rail to achieve the holding capacity. A hard stop is provided on the bottom wall which is perpendicular to the clip's travel direction. This perpendicular hard stop prevents the travel of the clip after reaching maximum distance by interfering with the tracker rail. The clips include four stiffeners on the side walls for locating purposes and preventing the clip from deviating from the required position.

FIGS. 25-28 illustrate clips having a wedge on the bottom wall that will compress and expand. The wedge is formed at a 15-degree angle from the center axis and the angle may vary based on load requirements and the slot size provided on the module rail to achieve the holding capacity. A hard stop is provided on the bottom wall which is perpendicular to the clip's travel direction. This perpendicular hard stop prevents the travel of the clip after reaching maximum distance by interfering with the tracker rail.

Figure 39:
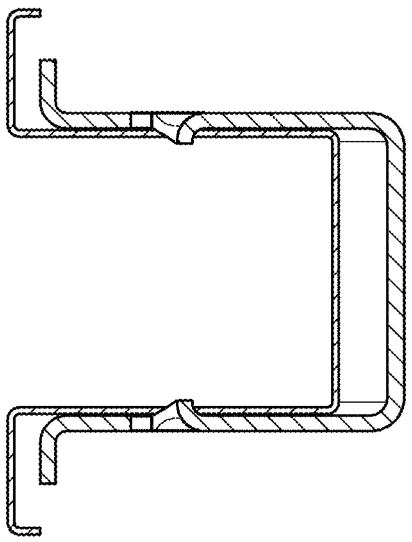
FIG. 39 is a side, cross-sectional view of the solar tracker rail of FIG. 29 shown coupled to the solar module rail of FIG. 2.
Figure 38:
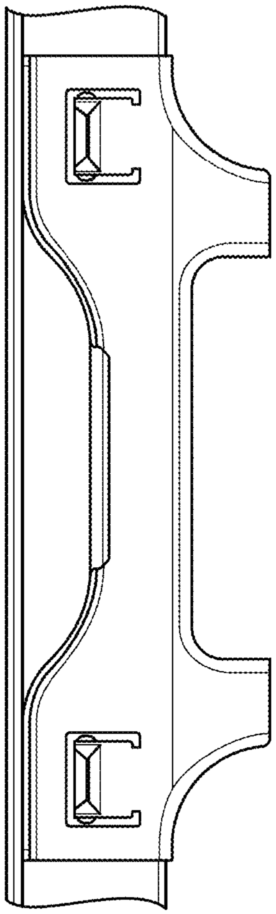
FIG. 38 is a front, elevation view of the solar tracker rail of FIG. 29 shown coupled to the solar module rail of FIG. 2.
Figure 37:
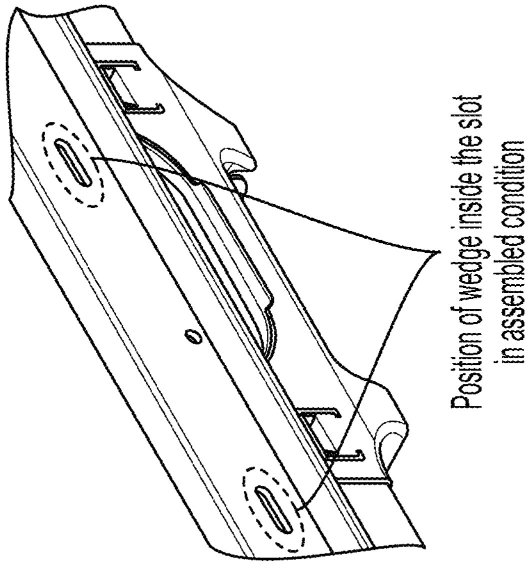
FIG. 37 is a perspective view of the solar tracker rail of FIG. 29 shown coupled to the solar module rail of FIG. 2.
Figure 40:
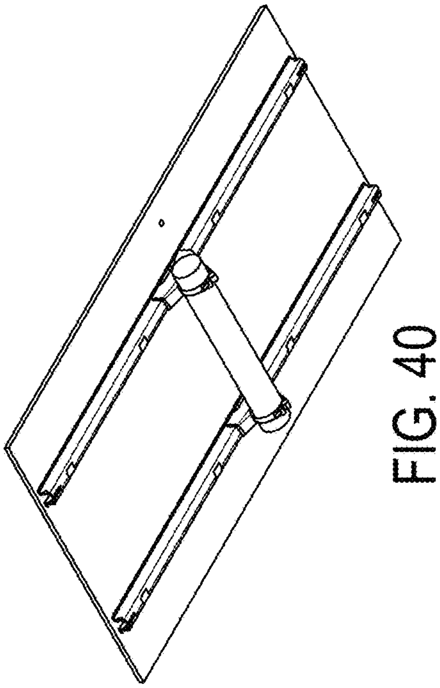
FIG. 40 is a perspective view of the solar tracker rail assembly of FIG. 7 shown coupled to the solar module assembly of FIG. 1.
Figure 41:
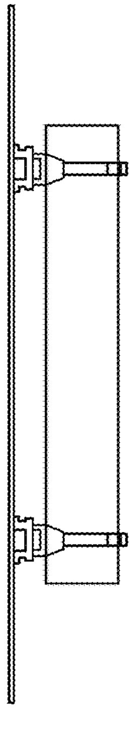
FIG. 41 is a side, elevation view of the solar tracker rail assembly of FIG. 7 shown coupled to the solar module assembly of FIG. 1.
Figure 42:
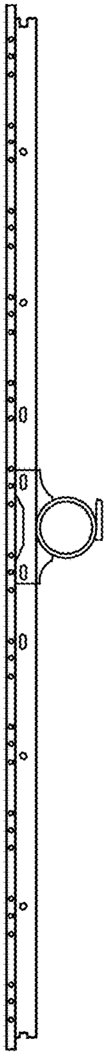
FIG. 42 is a front, elevation view of the solar tracker rail assembly of FIG. 7 shown coupled to the solar module assembly of FIG. 1.
Figure 43:
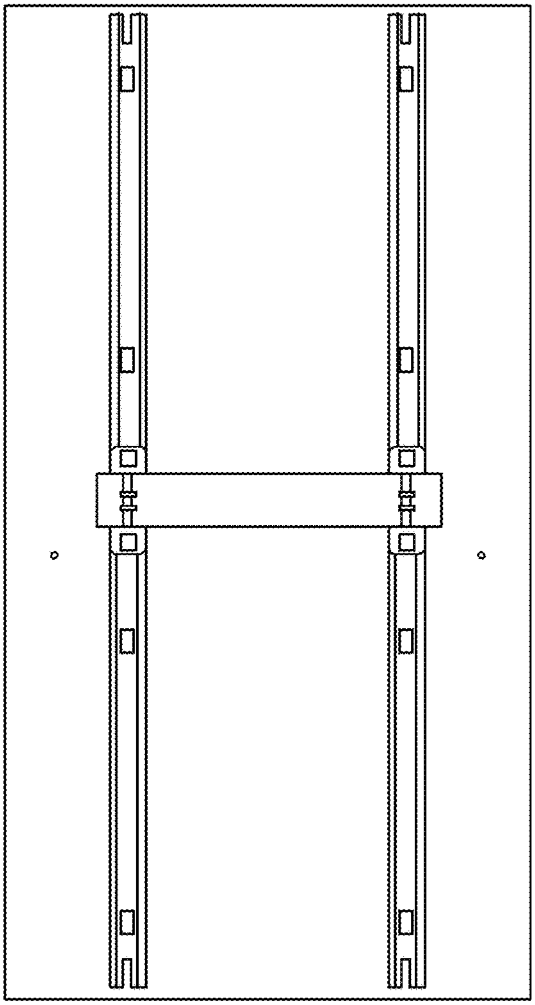
FIG. 43 is a bottom, plan view of the solar tracker rail assembly of FIG. 7 shown coupled to the solar module assembly of FIG. 1.
Figure 44:
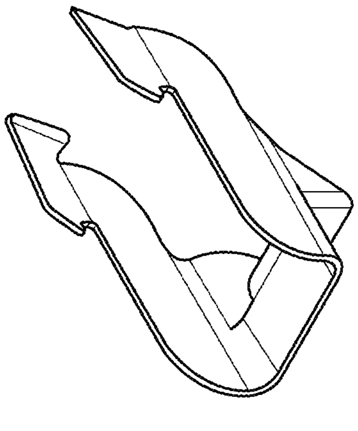
FIG. 44 is a perspective view of a swing clip provided in accordance with the present disclosure.
Figure 45:
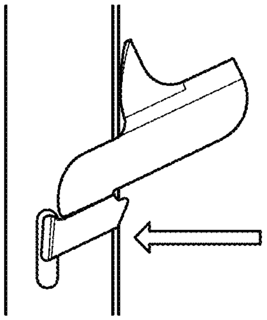
FIG. 45 is a side, elevation view of the swing clip of FIG. 44 shown in an initial, unsecured position relative to the solar module rail of FIG. 2.
Figure 46:
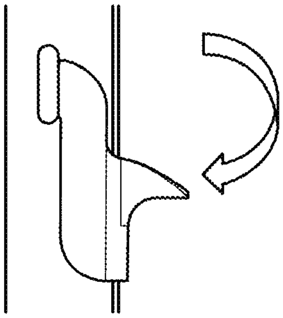
FIG. 46 is a side, elevation view of the swing clip of FIG. 44 shown in a second, secured position relative to the solar module rail of FIG. 2.
Figure 47:
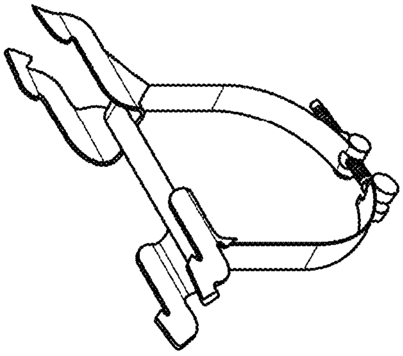
FIG. 47 is a perspective view of a pair of swing clips of FIG. 44 coupled to a torque tube clamp provided in accordance with the present disclosure.

FIGS. 29-39 illustrate a tracker rail with integrated wedges that act as a hook or engagement lock when the module rail is inserted from the top of the tracker rail. This wedge expands and compresses due to stiffness provided around it by removing material. The tracker rail includes a dipole with a semi-circular profile for engagement of a torque tube but a positive engagement mechanism is applicable to other profiles of the torque tube such as square, D-tube, Hexagon, Oval, Rectangular Hollow Section (RHS), etc. The tracker rail includes two slots that are 200 mm apart for mounting but based on requirements the mounting can be expanded to four slots. The integrated wedge profile includes a semi-circular profile that accommodates the module rail. The engagement between the wedge and the module rail is illustrated in FIG. 39. The hook profile provide in the wedge prevents the module rail from traveling in an upward direction once it is engaged with the wedge. FIGS. 37-39 illustrate the tracker rail and module rail where the wedge is in a full engagement with the slots of the module rail.

FIGS. 40-43 illustrate a solar tracker rail provided in accordance with the present disclosure coupled to solar tracker rails of a solar module assembly. The solar module rail is coupled to a torque tube using a clamp assembly that is operably coupled to a portion of the solar tracker rail.

FIGS. 44-47 illustrate a swing clip provided in accordance with the present disclosure. The swing clip hooks into either side of the slots of the hat channel/box channel of the solar module rail. Rotation of the clip forces the hook through the slot in the rail and secures the clip, and therefore, a clamp assembly, to the solar module rail. In this manner, the swing clip pairs are secured to the torque tube using a strap clamp, amongst others.

Figure 50:
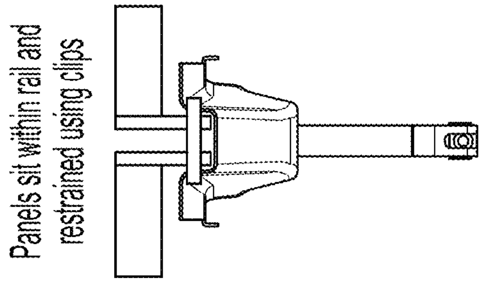
FIG. 50 is a side, elevation view of the solar tracker rail assembly of FIG. 48 shown coupled to a pair of solar modules using a solar tracker clip provided in accordance with the present disclosure.
Figure 49:
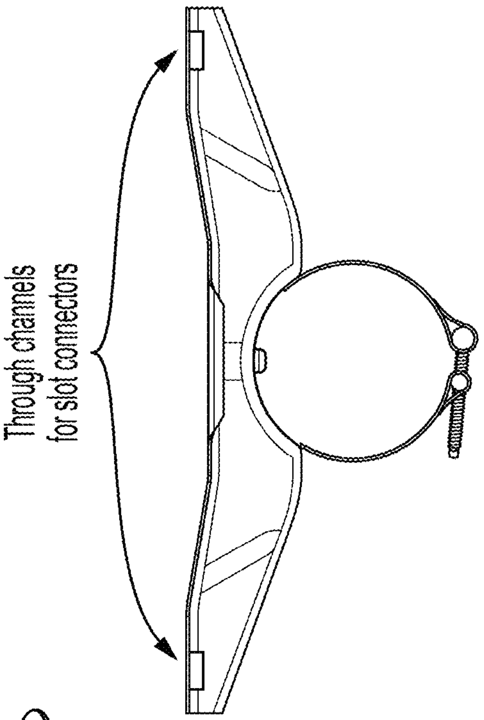
FIG. 49 is a front, elevation view of the solar tracker rail assembly of FIG. 48.
Figure 48:
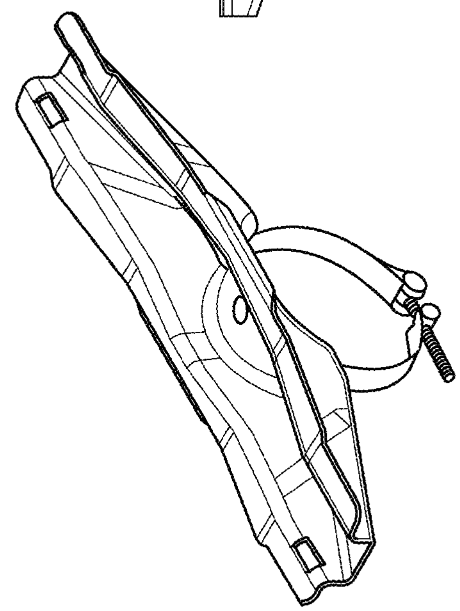
FIG. 48 is a perspective view of still another embodiment of a solar tracker rail assembly provided in accordance with the present disclosure.

FIGS. 48-50 illustrate another embodiment of a solar tracker rail assembly having a solar tracker rail coupled to a strap clamp. The solar tracker rail includes slots formed through portions thereof for receipt of a solar tracker clip to engage one or two solar modules to the solar tracker rail. The solar modules include a frame disposed about a perimeter thereof that includes two or more slots for selective engagement with solar tracker clips to selectively couple the solar modules to the solar tracker rail assembly. In embodiments, the solar module are FSLR series 6 PV modules.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:

a support rail including a pair of opposed flanges disposed in spaced relation to one another and defining a channel therebetween, each of the pair of opposed flanges including a respective slot defined therethrough; and a coupling clip comprising a coupling clip body that defines a central longitudinal axis, the coupling clip body configured to be received within each of the slots of the pair of opposed flanges and a portion of a module rail received within the channel of the support rail, wherein the coupling clip body includes a sidewall having at least one resilient finger disposed on a distal end portion of the sidewall and at least one protrusion disposed on a proximal portion of the sidewall, the sidewall being fixed in place relative to the central longitudinal axis, the at least one resilient finger comprising a first integral fold of coupling clip material along a first axis to extend the at least one resilient finger out from the body of the coupling clip at the first axis, the at least one resilient finger configured to engage a portion of a flange of the pair of opposed flanges to inhibit proximal movement of the coupling clip, the at least one protrusion comprising a second integral fold of coupling clip material along the first axis to extend the at least one protrusion perpendicularly out from the second integral fold of coupling clip material at the first axis and in a same direction out from the body as the at least one resilient finger, the at least one protrusion configured to engage a portion of an opposite flange of the pair of opposed flanges to inhibit distal movement of the coupling clip to selectively couple the module rail to the support rail.

2. The system of claim 1, wherein the at least one resilient finger is movable between a deployed movement inhibiting position and a retracted clip receiving position.

3. The system of claim 2, wherein the at least one resilient finger is biased to the deployed movement inhibiting position.

4. The system of claim 3, wherein the coupling clip is configured such that, as the at least one resilient finger is being received at the respective slot defined at each of the pair of opposed flanges, the bias of the at least one resilient finger is overcome to cause the at least one resilient finger to move from the deployed movement inhibiting position to the retracted clip receiving position.

5. The system of claim 4, wherein the coupling clip is configured such that as the at least one resilient finger is being received at the respective slot defined at each of the pair of opposed flanges the at least one resilient finger is at the retracted clip receiving position and when the at least one resilient finger is spaced apart from the respective slot defined at each of the pair of opposed flanges the at least one resilient finger is at the deployed movement inhibiting position.

6. The system of claim 5, wherein contact between the at least one resilient finger and each of the pair of opposed flanges at the location of the respective slot causes the bias of the at least one resilient finger to be overcome and cause the at least one resilient finger to move from the deployed movement inhibiting position to the retracted clip receiving position.

7. The system of claim 3, wherein the protrusion is non-movable relative to the coupling clip.

8. The system of claim 7, wherein the at least one resilient finger and the protrusion are configured such that the coupling clip is: (i) receivable within each of the slots of the pair of opposed flanges when the coupling clip is inserted therethrough in a direction where the at least one resilient finger leads the protrusion, (ii) prevented from reception within each of the slots of the pair of opposed flanges when the coupling clip is inserted therethrough in an opposite direction where the protrusion leads the at least one resilient finger.

9. The system of claim 8, wherein, when the at least one resilient finger is at the deployed movement inhibiting position, the at least one resilient finger extends out from the body of the coupling clip opposite the insertion direction where the at least one resilient finger leads the protrusion.

10. The system of claim 7, wherein the protrusion extends out from the body of the coupling clip a distance to create an interference stop at the protrusion between one of the slots of one of the pair of opposed flanges, and wherein the integral fold of coupling clip material is a planar member.

11. The system of claim 3, wherein, when the at least one resilient finger is at the deployed movement inhibiting position, the at least one resilient finger extends out from the body of the coupling clip in a direction toward the protrusion.

12. The system of claim 11, wherein, when the at least one resilient finger is at the deployed movement inhibiting position, the at least one resilient finger extends out from the distal end portion of the coupling clip at a skewed orientation so as to extend out in a direction toward the proximal end portion of the coupling clip.

13. The system of claim 1, wherein a body of the support rail defines a saddle shape that includes a torque tube receiving recess that is configured to interface with a torque tube.

14. The system of claim 13, wherein the respective slot defined through each of the pair of opposed flanges is located between the torque tube receiving recess and a top end of each of the pair of opposed flanges.

15. A coupling system for use with a solar tracker, comprising:

a support rail including a pair of opposed flanges disposed in spaced relation to one another and defining a channel therebetween, each of the pair of opposed flanges including a respective slot defined therethrough, wherein a body of the support rail defines a saddle shape that includes a torque tube receiving recess that is configured to interface with a torque tube, and wherein the respective slot defined through each of the pair of opposed flanges is located between the torque tube receiving recess and a top end of each of the pair of opposed flanges;

an attachment member extending out from the torque tube receiving recess, the attachment member and the torque tube recess configured to bound a perimeter of the torque tube; and a coupling clip comprising a coupling clip body that defines a central longitudinal axis, the coupling clip body configured to be received within each of the slots of the pair of opposed flanges and a portion of a module rail received within the channel of the support rail, the coupling clip body including a sidewall comprising a resilient wedge finger disposed on a distal end portion of the sidewall and a protrusion disposed on a proximal portion of the sidewall, the sidewall being fixed in place relative to the central longitudinal axis, the resilient wedge finger comprising a first integral fold of coupling clip material along a first axis to extend the at least one resilient finger out from the body of the coupling clip at the first axis, the at least one resilient finger configured to engage at least a portion of a flange of the pair of opposed flanges to inhibit proximal movement of the coupling clip, the protrusion comprising a second integral fold of coupling clip material along the first axis to extend the protrusion perpendicularly out from the second integral fold of coupling clip material at the first axis and in a same direction out from the body as the at least one resilient finger.

16. The system of claim 15, wherein the resilient wedge finger is configured to engage a portion of the pair of opposed flanges to inhibit proximal movement of the coupling clip and the protrusion is configured to engage a portion of an opposite flange of the pair of opposed flanges to inhibit distal movement of the coupling clip to selectively couple the module rail to the support rail.

17. The system of claim 16, wherein the resilient wedge finger is movable between a deployed movement inhibiting position and a retracted clip receiving position, and wherein the resilient wedge finger is biased to the deployed movement inhibiting position.

18. The system of claim 17, wherein the coupling clip is configured such that as the resilient wedge finger is being received at the respective slot defined at each of the pair of opposed flanges the resilient wedge finger is at the retracted clip receiving position and when the resilient wedge finger is spaced apart from the respective slot defined at each of the pair of opposed flanges the resilient wedge finger is at the deployed movement inhibiting position.

19. The system of claim 17, wherein the protrusion is non-movable relative to the coupling clip.

20. The system of claim 19, wherein the resilient wedge finger and the protrusion are configured such that the coupling clip is: (i) receivable within each of the slots of the pair of opposed flanges when the coupling clip is inserted therethrough in a direction where the resilient wedge finger leads the protrusion, (ii) prevented from reception within each of the slots of the pair of opposed flanges when the coupling clip is inserted therethrough in an opposite direction where the protrusion leads the resilient wedge finger.

* * * * *